United States Patent
Okamoto et al.

(10) Patent No.: US 6,268,462 B1
(45) Date of Patent: Jul. 31, 2001

(54) BRANCHED POLYCARBONATE RESIN AND PROCESS FOR THE PREPARATION THEREOF

(75) Inventors: Masaya Okamoto; Yasuhiro Ishikawa, both of Ichihara (JP)

(73) Assignee: Idemitsu Petrochemical Co., Ltd., Tokyo (JP)

(*) Notice: Subject to any disclaimer, the term of this patent is extended or adjusted under 35 U.S.C. 154(b) by 0 days.

(21) Appl. No.: 09/485,703

(22) PCT Filed: Aug. 24, 1998

(86) PCT No.: PCT/JP98/03743

§ 371 Date: May 9, 2000

§ 102(e) Date: May 9, 2000

(87) PCT Pub. No.: WO99/10406

PCT Pub. Date: Mar. 4, 1999

(30) Foreign Application Priority Data

Aug. 26, 1997 (JP) .................................... 9-228742

(51) Int. Cl.$^7$ .................................... C08G 64/00
(52) U.S. Cl. .............................................. 528/204
(58) Field of Search ................................ 528/204

(56) References Cited

U.S. PATENT DOCUMENTS 4,415,725 * 11/1983 Hedges et al. .................... 528/204

* cited by examiner

*Primary Examiner*—Terressa M. Boykin
(74) *Attorney, Agent, or Firm*—Oblon, Spivak, McClelland, Maier & Neustadt, P.C.

(57) ABSTRACT

A branched polycarbonate resin which is prepared by using a tetrahydric phenol having a specific structure as the branching agent, has a branching agent content [branching agent/(dihydric phenol+terminating agent+branching agent)×100] of 0.05 to 0.5 mole % and satisfies the relationship: $y \geq 11x + 0.5$ (wherein x is the branching agent content of the resin; and y is the melt tension (g) thereof at 280° C.); and a process for preparing a branched polycarbonate from a dihydric phenol, phosgene or a carbonic acid ester, a branching agent and an terminating agent, characterized by preparing an oligocarbonate, particularly one having chloroformate groups without the addition of the terminating agent, and then reacting the oligocarbonate with the dihydric phenol and the terminating agent. This process can provide a branched polycarbonate which is lowered in the branching agent content, exhibits a high melt tension and good melt characteristics, and can be stably molded through blow molding, extrusion, vacuum forming and so on.

10 Claims, No Drawings

BRANCHED POLYCARBONATE RESIN AND PROCESS FOR THE PREPARATION THEREOF

TECHNICAL FIELD

The present invention relates to a branched polycarbonate resin and a method for producing it, and precisely to a branched polycarbonate resin of which the branching agent content is low and the melt tension is high and which therefore has improved moldability in blow molding, extrusion, vacuum forming and so on, and also to a method for producing the resin.

BACKGROUND OF THE INVENTION

Generally having good transparency, good heat resistance and good mechanical properties, polycarbonate resins to be produced from bisphenol A and others have many applications in various fields. However, the polycarbonate resins generally have low melt tension. Therefore, when molded through blow molding, extrusion, vacuum forming and so on, they are often defective in that their moldings could not all the time have even thickness. In addition, as they often draw down while being molded, they could not be formed into satisfactory moldings.

For overcoming the defects, Japanese Patent Laid-Open No. 47228/1984 discloses a method of adding from 0.1 to 2.0 mol % or so of a branching agent having three functional groups to a polymerization system to give a branched polycarbonate resin. The melt tension of the branched polycarbonate resin as produced according to that method could surely be increased in some degree, but is not still on a satisfactory level. On the other hand, in order to produce a branched polycarbonate resin having a satisfactory level of melt tension according to the method, a large amount of the branching agent must be used. In that case, however, increasing the amount of the branching agent added will lead to an unfavorable situation where crosslinked polycarbonate resins are readily produced. This is problematic in that the resins are often gelled. In addition, it is said that, with the increase in the branching agent added, the impact resistance of the polycarbonates produced is to lower. For these reasons, the acceptable amount of the branching agent is limited, and it is desired to reduce as much as possible the amount of the branching agent to be added.

On the other hand, U.S. Pat. No. 4,415,725 discloses a branched polycarbonate resin for which a tetrahydric phenol is used as the branching agent. However, the branched polycarbonate resin has low melt tension, and its moldability in blow molding, extrusion, vacuum forming and so on is not still satisfactory.

The object of the present invention is to provide a branched polycarbonate resin of which the branching agent content is controlled low and which has high melt tension and good melt characteristics and can be stably produced and molded through blow molding, extrusion, vacuum forming and so on.

DISCLOSURE OF THE INVENTION

We, the present inventors have assiduously studied so as to attain the object noted above, and, as a result, have found that the above-mentioned object can be attained by a specific polymerization method of producing a branched polycarbonate resin in which is used a tetrahydric phenol having a specific structure as the branching agent. On the basis of this finding, we have completed the present invention.

Specifically, the invention is to provide a branched polycarbonate resin and a method for producing it, which are mentioned below.

(1) A branched polycarbonate resin for which is used a tetrahydric phenol having a structure of the following general formula and serving as a branching agent, and which has a branching agent content x:(branching agent/(dihydric phenol+terminating agent+branching agent)×100) x, of from 0.05 to 0.5 mol % and satisfies a relationship of $y \geq 11x+0.5$ where x indicates the branching agent content of the resin and y indicates the melt tension (g) of the resin at 280° C.:

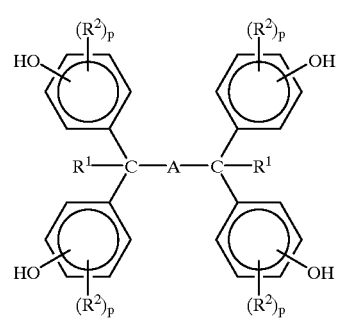

(1)

wherein A, $R^1$, $R^2$ and p are as follows:

A represents a single bond, an alkylene or alkylidene group having from 1 to 20 carbon atoms, a polymethylene group having from 3 to 20 carbon atoms, a cycloalkylene or cycloalkylidene group having from 5 to 20 carbon atoms, an arylene or arylalkylene group having from 6 to 20 carbon atoms, —O—, —CO—, —S—, —SO—, or —SO$_2$—;

$R^1$ represents a hydrogen atom, an alkyl group having from 1 to 8 carbon atoms, an aryl group having from 6 to 20 carbon atoms, or an arylalkyl group having from 7 to 20 carbon atoms;

$R^2$ represents a halogen atom, an alkyl group having from 1 to 8 carbon atoms, an aryl group having from 6 to 20 carbon atoms, or an arylalkyl group having from 7 to 20 carbon atoms;

p represents an integer of from 0 to 4.

(2) A method for producing a branched polycarbonate resin of (1) from a dihydric phenol, phosgene or a carbonate compound, a branching agent and a terminating agent, wherein an oligocarbonate is first prepared without adding the terminating agent thereto, and thereafter the resulting oligocarbonate is reacted with the dihydric phenol and the terminating agent.

(3) A method for producing a branched polycarbonate resin of (1) from a dihydric phenol, phosgene, a branching agent and a terminating agent, wherein an oligocarbonate having chloroformate groups is first prepared without adding the terminating agent thereto, and thereafter the resulting oligocarbonate is reacted with the dihydric phenol and the terminating agent.

BEST MODE FOR CARRYING OUT THE INVENTION

The invention is described in detail hereinunder.

1. Branched polycarbonate resin:

The branched polycarbonate resin of the invention is characterized by the following characteristics:

(1) Characteristics:

① Branching agent content:

The branching agent content of the resin indicates the mol % of the branching agent in the resin, relative to the number of all mols of (dihydric phenol+terminating agent+ branching agent) therein, and falls between 0.05 and 0.5 mol %, but preferably between 0.07 and 0.45 mol %. If the content is smaller than 0.05 mol %, the melt tension of the resin will be low, and blow molding of the resin will be difficult. If, on the other hand, the content is larger than 0.5 mol %, the resin will be crosslinked and gelled whereby the impact resistance of the moldings of the resin will be low.

② Relationship between the branching agent content, x, and the melt tension, y (g), at 280° C.:

The resin must satisfy a relationship of $y \geq 11x+0.5$, preferably $y \geq 13x+0.5$, more preferably $y \geq 14x+0.5$, where x indicates the branching agent content of the resin and y indicates the melt tension of the resin at 280° C. The melt tension of the resin increases with the increase in the amount of the branching agent added to the resin. However, the polycarbonate resin will be crosslinked and gelled, if the amount of the branching agent added thereto increases too much. Therefore, it is necessary to control low the amount of the branching agent to be added to the resin while realizing high melt tension of the resin.

③ Viscosity-average molecular weight (Mv):

Preferably, the viscosity-average molecular weight (Mv) of the resin falls between 19000 and 37000, more preferably between 20000 and 30000. If Mv is smaller than 19000, the melt tension of the resin will be low, and blow molding of the resin will be difficult. If larger than 37000, however, the fluidity of the resin will be lowered and the moldability thereof will be poor.

(2) Method for production:

The method for producing the branched polycarbonate resin of the invention is not specifically defined. Starting materials to be mentioned hereinunder may be used for producing the resin. Concretely, for example, a dihydric phenol, phosgene or a carbonate compound, and a specific branching agent are reacted optionally along with any other components necessary for the reaction, but without adding a terminating agent thereto, to prepare an oligocarbonate, and thereafter the resulting oligocarbonate is reacted with a dihydric phenol and a terminating agent. This is one preferred embodiment for producing the resin of the invention. In the step of adding the terminating agent to the oligocarbonate in the embodiment, it is desirable that both the dihydric phenol and the terminating agent are not added at the same time to the oligocarbonate, but the dihydric phenol only is first added thereto so that it is reacted with the oligocarbonate, and thereafter the terminating agent is added thereto.

(i) Starting materials:

The resin of the invention is produced from starting materials of a dihydric phenol, phosgene or a carbonate compound, a branching agent and a terminating agent.

① The dihydric phenol includes hydroquinone, 4,4'-dihydroxydiphenyl, bis(4-hydroxyphenyl)alkanes, bis(4-hydroxyphenyl)cycloalkanes, bis(4-hydroxyphenyl) alkanes, bis(4-hydroxyphenyl)cycloalkanes, bis(4-hydroxyphenyl) oxide, bis(4-hydroxyphenyl) sulfide, bis(4-hydroxyphenyl) sulfone, bis(4-hydroxyphenyl) ketone, 9,9-bis(4-hydroxyphenyl)fluorene, etc., and their halogenated derivatives. Of those, preferred is 2,2-bis(4-hydroxyphenyl)propane (bisphenol A). These dihydric phenols may be used either singly or as combined. Any other difunctional compounds (for example, dicarboxylic acids such as decanedicarboxylic acid, etc.) except dihydric phenols may also be used along with the above-mentioned dihydric phenols.

② The carbonate compound includes diaryl carbonates such as diphenyl carbonate, etc.; and dialkyl carbonates such as dimethyl carbonate, dimethyl carbonate, etc. These carbonate compounds may be used either singly or as combined.

③ The branching agent is represented by the following general formula:

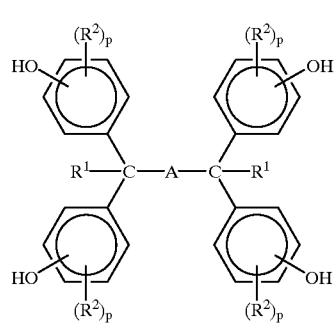

(1)

wherein A, $R^1$, $R^2$ and p are as follows:

A represents a single bond, an alkylene or alkylidene group having from 1 to 20 carbon atoms, a polymethylene group having from 3 to 20 carbon atoms, a cycloalkylene or cycloalkylidene group having from 5 to 20 carbon atoms, an arylene or arylalkylene group having from 6 to 20 carbon atoms, —O—, —CO—, —S—, —SO—, or —SO$_2$—;

$R^1$ represents a hydrogen atom, an alkyl group having from 1 to 8 carbon atoms, an aryl group having from 6 to 20 carbon atoms, or an arylalkyl group having from 7 to 20 carbon atoms;

$R^2$ represents a halogen atom, an alkyl group having from 1 to 8 carbon atoms, an aryl group having from 6 to 20 carbon atoms, or an arylalkyl group having from 7 to 20 carbon atoms;

p represents an integer of from 0 to 4.

Specific compounds for the branching agent are 1,1,2,2-tetrakis(4-hydroxyphenyl)ethane, 1,1,3,3-tetrakis(4-hydroxyphenyl)propane, 2,2,5,5-tetrakis(4-hydroxyphenyl) hexane, 2,2,4,4-tetrakis(4-hydroxyphenyl)pentane, 1,1,2,2-tetrakis(3-methyl-4-hydroxyphenyl)ethane, 2,2,6,6-tetrakis (3-methyl-4-hydroxyphenyl)octane, 1,1,6,6-tetrakis(3-chloro-4-hydroxyphenyl)heptane, 2,2,5,5-tetrakis(3,5-dimethyl-4-hydroxyphenyl)hexane, 2,2,5,5-tetrakis(3-bromo-5-methyl-4-hydroxyphenyl)hexane, 2-(2-hydroxyphenyl)-2,5,5-tris(4-hydroxyphenyl)hexane, 2-(4-hydroxyphenyl)-2,5,5-tris(3-chloro-4-hydroxyphenyl) hexane, 2-(3,5-dichloro-4-hydroxyphenyl)-2,5,5-tris(3-chloro-4-hydroxyphenyl)hexane, 2-(3-chloro-2-hydroxyphenyl)-2,5,5-tris(3-chloro-4-hydroxyphenyl) hexane, 2,2,5,5-tetrakis(3-tert-butyl-5-methyl-4-hydroxyphenyl)hexane, 2,2-bis(4-hydroxyphenyl)-5,5-bis (3-methyl-4-hydroxyphenyl)hexane, α,α,α',α'-tetrakis(4-hydroxyphenyl)-p-xylene, α,α,α',α'-tetrakis(3-methyl-4-hydroxyphenyl)-p-xylene, α,α'-dimethyl-α,α,α',α'-tetrakis (4-hydroxyphenyl)-p-xylene, etc. Of those, preferred is 1,1,2,2-tetrakis(4-hydroxyphenyl)ethane.

These branching agents may be used either singly or as combined.

④ The terminating agent is not specifically defined for its structure, provided that it is a monohydric phenol. For example, it includes p-tert-butylphenol, p-tert-octylphenol, p-cumylphenol, p-tert-amylphenol, p-nonylphenol, p-cresol, 2,4,6-tribromophenol, p-bromophenol, 4-hydroxybenzophenone, phenol, etc. These terminating agents may be used either singly or as combined.

(ii) Various additives such as antioxidants, lubricants, anti-weathering agents, colorants, nucleating agents and others may be added to the resin of the invention, so far as they do not interfere with the characteristics of the resin. Where the resin is used for sheets in the field of construction materials, anti-weathering agents are preferably added thereto. For foamed sheets, nucleating agents are preferably added to the resin.

2. Method for producing the branched polycarbonate resin mentioned above:

It is desirable that the branched polycarbonate resin of the invention is produced according to the method mentioned below.

Starting materials of a dihydric phenol, phosgene or a carbonate compound but preferably phosgene, a branching agent and a terminating agent such as those mentioned hereinabove are used to produce the branched polycarbonate resin. First prepared is an oligocarbonate, preferably one having chloroformate groups. For this, it is desirable that a dihydric phenol, phosgene or a carbonate compound but preferably phosgene, a branching agent and any other optional components necessary for the reaction are reacted, without adding a terminating agent thereto, to give an oligocarbonate, preferably one having chloroformate groups. Next, the resulting oligocarbonate is reacted with a dihydric phenol and a terminating agent. If the starting materials of a dihydric phenol, phosgene or a carbonate compound, a branching agent and a terminating agent are put into a reactor all at the same time, and reacted in one step to give a polycarbonate resin, the melt tension of the resin produced will be low even though the molecular weight thereof could be comparable to that of the resin as produced in the preferred manner as above.

More preferably, in the step of adding the dihydric phenol and the terminating agent to the oligocarbonate, the terminating agent is not added thereto simultaneously with the dihydric phenol, but the dihydric phenol only is first added thereto and reacted with the oligocarbonate and thereafter the terminating agent is added thereto. The growth of the oligocarbonate to be the intended polymer is terminated by adding the terminating agent to the growing oligocarbonate. Therefore, the oligocarbonate is first reacted with the dihydric phenol added thereto to thereby prolong the polymer chain to some degree, and thereafter the terminating agent is added thereto. According to this method, the shortest chains extending from the branching agent in the branched polycarbonate resin formed could be longer and therefore the melt tension of the resin could be increased more, even though the viscosity-average molecular weight and the branching agent content of the resin are the same as those of the resin to be produced in different methods. On the other hand, however, if the terminating agent is added to the oligocarbonate simultaneously with the dihydric phenol thereto, the chains from the branching agent in the oligocarbonate will first react with the terminating agent before they react with the dihydric phenol to be longer. If so, it is difficult to further prolong the chains from the branching agent in the oligocarbonate, and therefore the melt tension of the resulting resin could not increase even though the viscosity-average molecular weight and the branching agent content of the resin are comparable to those of the resin as produced in the preferred manner as above. The time at which the terminating agent is added to the oligocarbonate is described. Concretely, to the oligocarbonate having chloroformate groups, it is desirable that the terminating agent is added at the time at which the chloroformate groups still remain in the oligocarbonate in an amount equimolar to the amount of the terminating agent to be added to the oligocarbonate, or that is, the terminating agent shall be added thereto before all chloroformate groups in the oligocarbonate have reacted with the dihydric phenol added thereto. In other words, it is desirable that the terminating agent is added to the oligocarbonate at the time at which the amount of the chloroformate groups remaining in the oligocarbonate still fall between 5 and 60 mol % relative to 100 mol % of the chloroformate groups originally existing in the oligocarbonate before the dihydric alcohol is added to the oligocarbonate.

(iii) Various additives such as antioxidants, lubricants, anti-weathering agents, colorants, nucleating agents and others may be added to the resin of the invention, so far as they do not interfere with the characteristics of the resin. Where the resin is used for sheets in the field of construction materials, anti-weathering agents are preferably added thereto. For foamed sheets, nucleating agents are preferably added to the resin.

The invention is described in more detail with reference to the following Examples, which, however, are not intended to restrict the scope of the invention.

In the following Examples and Comparative Examples, the viscosity-average molecular weight (Mv) and the branching agent content of the resin samples produced were obtained according to the methods mentioned below.

Mv:

Using an Ubbelohde's viscometer, the limiting viscosity $[\eta]$ of a resin sample in a methylene chloride solution at 20° C. was measured, and the viscosity-average molecular weight, Mv, of the resin was obtained according to the following relational formula:

$$[\eta]=1.23\times10^{-5}\cdot Mv^{0.83}$$

Branching agent content:

Resin flakes were decomposed in an alkali, and the branching agent content of the resin was obtained through liquid chromatography.

Melt tension:

A resin sample was extruded out through an orifice with L/D=8/2.1, at a temperature of 280° C., at an extrusion rate of 10 mm/min, and at a take-up rate of 157 mm/sec, whereupon the tension (g) of the resin was measured.

Example 1

Production of branched polycarbonate A:

0.043 mol of 1,1,2,2-tetrakis(4-hydroxyphenyl)ethane (TEP-DF from Asahi Chemical Material Industry), 9.2 mols of bisphenol A, 9.4 liters of an aqueous solution of 2.0 N sodium hydroxide, and 8 liters of dichloromethane were put into a 50 liters container equipped with a stirrer, and stirred therein, to which phosgene was introduced for 30 minutes. Next, 0.44 mol of bisphenol A, 0.022 mol of triethylamine, and 4.5 liters of an aqueous solution of 0.2 N sodium hydroxide were added thereto, and reacted for 40 minutes, and thereafter the aqueous phase and the organic phase in the reaction mixture were separated from each other. Thus was prepared a dichloromethane solution of an oligocarbonate.

0.44 mol of p-tert-butylphenol was dissolved in the resulting oligocarbonate, to which was added a solution of 335 g of sodium hydroxide and 2.2 mols of bisphenol A as dissolved in 4.5 liters of water. To this were further added 0.017 mols of triethylamine and 6 liters of dichloromethane. These were stirred at 500 rpm and reacted for 60 minutes. After the reaction, the aqueous phase and the organic phase in the reaction mixture were separated from each other. The organic phase was then washed with water, an alkali (aqueous solution of 0.03 N sodium hydroxide), an acid (0.2

N hydrochloric acid) and again water in that order (this was washed with water twice in total). After having been thus washed, dichloromethane was removed from this. Thus were obtained polycarbonate flakes, which were then dried at 120° C. for 24 hours.

The polycarbonate obtained herein had a viscosity-average molecular weight of 30000, a branching agent content of 0.35 mol %, and a melt tension of 8.9 g.

Comparative Example 1

Production of branched polycarbonate a:

The same process as in Example 1 was repeated, except that 1,1,1-tris(4-hydroxyphenyl)ethane was used in place of 1,1,2,2-tetrakis(4-hydroxyphenyl)ethane. The polycarbonate obtained herein had a viscosity-average molecular weight of 25100, a branching agent content of 0.35 mol %, and a melt tension of 3.0 g.

Example 2

Production of branched polycarbonate B:

The same process as in Example 1 was repeated, except that the amount of 1,1,2,2-tetrakis(4-hydroxyphenyl)ethane which was 0.043 mol in Example 1 was reduced to a half, 0.0215 mol, and that the amount of p-tert-butylphenol which was 0.44 mol in Example 1 was changed to 0.40 mol herein.

The polycarbonate obtained herein had a viscosity-average molecular weight of 27600, a branching agent content of 0.17 mol %, and a melt tension of 3.2 g.

Comparative Example 2

Production of branched polycarbonate b:

The same process as in Example 2 was repeated, except that 1,1,1-tris(4-hydroxyphenyl)ethane was used in place of 1,1,2,2-tetrakis (4-hydroxyphenyl) ethane. The polycarbonate obtained herein had a viscosity-average molecular weight of 22800, a branching agent content of 0.17 mol %, and a melt tension of 0.7 g.

Comparative Example 3

Production of branched polycarbonate c:

0.018 mol of 1,1,2,2-tetrakis(4-hydroxyphenyl)ethane (TEP-DF from Asahi Chemical Material Industry), and 10 mols of bisphenol A were dissolved in 10 liters of an aqueous solution of 2.0 N sodium hydroxide, in a 50 liters container equipped with a stirrer. A solution of 0.37 mol of p-tert-butylphenol as dissolved in 8 liters of dichloromethane, and 28 ml of triethylamine were added thereto, and stirred at 300 rpm. To this was introduced phosgene at a flow rate of 30 g/min, for 47 minutes. After the reaction, the aqueous phase and the organic phase in the reaction mixture were separated from each other. The organic phase was then washed with water, an alkali (aqueous solution of 0.03 N sodium hydroxide), an acid (0.2 N hydrochloric acid) and again water in that order (this was washed with water twice in total). After having been thus washed, dichloromethane was removed from this. Thus were obtained polycarbonate flakes, which were then dried at 120° C. for 24 hours.

The polycarbonate obtained herein had a viscosity-average molecular weight of 27700, a branching agent content of 0.17 mol %, and a melt tension of 2.1 g.

INDUSTRIAL APPLICABILITY

The branching agent content of the branched polycarbonate resin of the invention is controlled low, and the melt tension of the resin is high. The resin has good melt characteristics and is suitable to applications for blow molding, extrusion, vacuum forming and so on.

What is claimed is:

1. A method for producing a branched polycarbonate resin comprising reacting with at least one compound selected from the group consisting of phosgene, dihydric phenol, and carbonate with a branching agent to produce an oligocarbonate; and reacting said oligocarbonate with dihydric phenol and a terminating agent.

2. The method of claim 1, wherein said branched polycarbonate resin has a branching agent content x, wherein x equals branching agent/(dihydric phenol+terminating agent+branching aget)×100, and wherein x is from 0.05 to 0.5 mol % and the resin satisfies the relationship of $y \geq 11x+0.5$, wherein y represents the melt tension (g) of the resin at 280° C.

3. The method of claim 2, wherein the resin satisfies the relationship of $y \geq 13x+0.5$.

4. The method of claim 2, wherein the resin satisfies the relationship of $y \geq 14x+0.5$.

5. The method of claim 1, wherein the viscosity-average molecular weight of the branched polycarbonate resin is from 19000 and 37000.

6. The method of claim 1, wherein said oligocarbonate is reacted with dihydric phenol followed by said terminating agent.

7. The method of claim 1, wherein the dihydric phenol is selected from the group consisting of hydroquinone, 4,4'-dihydroxydiphenyl, bis(4-hydroxyphenyl)alkanes, bis(4-hydroxyhenyl)cycloalkanes, bis(4-hydroxyphenyl)alkanes, bis(4-hydroxyphenyl)cycloalkanes, bis(4-hydroxyphenyl) oxide, bis(4-hydroxyphenyl) sulfide, bis(4-hydroxyphenyl) sulfone, bis(4-hydroxyphenyl) ketone, 9,9-bis(4-hydroxyphenyl)fluorene, and mixtures thereof.

8. The method of claim 1, wherein said carbonate is a diaryl carbonate or a dialkyl carbonate.

9. The method of claim 1, wherein said branching agent of the formula:

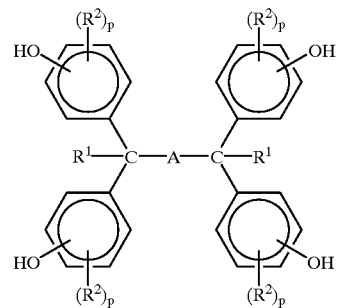

(1)

wherein A, $R^1$, $R^2$ and p are as follows:

A represents a single bond, an alkylene or alkylidene group having from 1 to 20 carbon atoms, a polymethylene group having from 3 to 20 carbon atoms, a cycloalkylene having from 5 to 20 carbon atoms, a cycloalkylidene group having from 5 to 20 carbon atoms, an arylene having from 6 to 20 carbon atoms, an arylalkylene group having from 6 to 20 carbon atoms, —O—, —CO—, —S—, —SO—, or —SO$_2$—;

$R^1$ represents a hydrogen atom, an alkyl group having from 1 to 8 carbon atoms, an aryl group having from 6 to 20 carbon atoms, or an arylalkyl group having from 7 to 20 carbon atoms;

$R^2$ represents a halogen atom, an alkyl group having from 1 to 8 carbon atoms, an aryl group having from 6 to 20 carbon atoms, or an arylalkyl group having from 7 to 20 carbon atoms;

p represents an integer of from 0 to 4.

10. The method of claim 1, wherein said terminating agent is a monohydric phenol.

* * * * *